United States Patent
Dooley et al.

(10) Patent No.: US 8,076,882 B2
(45) Date of Patent: Dec. 13, 2011

(54) MOTOR DRIVE ARCHITECTURE WITH ACTIVE SNUBBER

(75) Inventors: Kevin A. Dooley, Mississauga (CA); Gregory I. Rozman, Rockford, IL (US)

(73) Assignees: Pratt & Whitney Canada Corp., Longueuil (CA); Hamilton Sundstrand CorporationCT (US)

( * ) Notice: Subject to any disclaimer, the term of this patent is extended or adjusted under 35 U.S.C. 154(b) by 293 days.

(21) Appl. No.: 11/964,123

(22) Filed: Dec. 26, 2007

(65) Prior Publication Data
US 2009/0167225 A1    Jul. 2, 2009

(51) Int. Cl.
H02P 6/14    (2006.01)
(52) U.S. Cl. .......... 318/400.25; 318/400.01; 318/400.24
(58) Field of Classification Search ............. 318/400.25, 318/400.24, 400.01
See application file for complete search history.

(56) References Cited

U.S. PATENT DOCUMENTS

| | | | |
|---|---|---|---|
| 2,564,320 A | 8/1951 | Brainard | |
| 2,886,762 A | 5/1959 | Polasek | |
| 3,671,788 A | 6/1972 | Knudson et al. | |
| 3,678,352 A | 7/1972 | Bedford | |
| 3,710,226 A | 1/1973 | Seike | |
| 3,768,002 A | 10/1973 | Drexler et al. | |
| 3,860,883 A | 1/1975 | Bernin | |
| 4,039,910 A | 8/1977 | Chirgwin | |
| 4,426,606 A * | 1/1984 | Suita et al. | 318/375 |
| 4,450,396 A | 5/1984 | Thornton | |
| 4,480,218 A | 10/1984 | Hair | |
| 4,489,265 A | 12/1984 | Kuznetsov | |
| 4,492,902 A | 1/1985 | Ficken et al. | |
| 4,654,551 A | 3/1987 | Farr | |
| 4,654,566 A | 3/1987 | Erdman | |
| 4,766,362 A | 8/1988 | Sadvary | |
| 4,827,393 A | 5/1989 | Clark | |
| 4,887,020 A | 12/1989 | Graham | |
| 5,202,614 A | 4/1993 | Peters et al. | |
| 5,235,503 A * | 8/1993 | Stemmler et al. | 363/37 |
| 5,245,238 A | 9/1993 | Lynch et al. | |
| 5,260,642 A | 11/1993 | Huss | |
| 5,331,261 A * | 7/1994 | Brown et al. | 318/376 |
| 5,397,975 A | 3/1995 | Syverson | |
| 5,423,192 A | 6/1995 | Young et al. | |
| 5,436,540 A * | 7/1995 | Kumar | 318/375 |
| 5,473,240 A | 12/1995 | Moreira | |
| 5,481,166 A | 1/1996 | Moreira | |
| 5,502,368 A | 3/1996 | Syverson et al. | |

(Continued)

FOREIGN PATENT DOCUMENTS

CA    2051626 A1    8/1991
(Continued)

OTHER PUBLICATIONS

MC33035, NCV33035—Brushless DC Motor Controller, Semiconductor Components Industries, LLC, 2002, May 2002.
(Continued)

*Primary Examiner* — Walter Benson
*Assistant Examiner* — David S Luo
(74) *Attorney, Agent, or Firm* — Norton Rose OR LLP

(57) ABSTRACT

A method and apparatus is disclosed for controlling a system comprising at least one electric motor. The motor drive circuit includes a reconfigurable active snubber. Under given resonance conditions, the active snubber is configured to use a resistive element to dissipate electrical transients across the commutation circuit.

14 Claims, 6 Drawing Sheets

U.S. PATENT DOCUMENTS

| | | | |
|---|---|---|---|
| 5,517,095 A | 5/1996 | Carobolante et al. | |
| 5,598,078 A * | 1/1997 | Maeda | 318/696 |
| 5,631,544 A | 5/1997 | Syverson et al. | |
| 5,677,605 A * | 10/1997 | Cambier et al. | 318/400.14 |
| 5,693,995 A | 12/1997 | Syverson | |
| 5,710,471 A | 1/1998 | Syverson et al. | |
| 5,710,699 A * | 1/1998 | King et al. | 363/132 |
| 5,714,823 A | 2/1998 | Shervington et al. | |
| 5,739,652 A | 4/1998 | Sriram | |
| 5,745,353 A * | 4/1998 | Sato et al. | 363/56.1 |
| 5,747,909 A | 5/1998 | Syverson et al. | |
| 5,751,131 A | 5/1998 | Sears et al. | |
| 5,753,989 A | 5/1998 | Syverson et al. | |
| 5,847,535 A * | 12/1998 | Nordquist et al. | 318/700 |
| 5,859,520 A | 1/1999 | Bourgeois et al. | |
| 5,864,474 A * | 1/1999 | Jang | 363/39 |
| 5,874,797 A | 2/1999 | Plnkerton | |
| 5,877,947 A * | 3/1999 | Chen et al. | 363/53 |
| 5,903,116 A | 5/1999 | Geis et al. | |
| 5,925,999 A | 7/1999 | Lakerdas et al. | |
| 5,942,818 A | 8/1999 | Satoh et al. | |
| 5,953,491 A | 9/1999 | Sears et al. | |
| 5,955,809 A | 9/1999 | Shah | |
| 6,031,294 A | 2/2000 | Geis et al. | |
| 6,163,127 A | 12/2000 | Patel et al. | |
| 6,184,647 B1 | 2/2001 | Oguro et al. | |
| 6,208,110 B1 | 3/2001 | O'Meara et al. | |
| 6,236,183 B1 | 5/2001 | Schroeder | |
| 6,252,751 B1 | 6/2001 | Rozman | |
| 6,265,786 B1 | 7/2001 | Bosley et al. | |
| 6,297,977 B1 | 10/2001 | Huggett et al. | |
| 6,323,625 B1 | 11/2001 | Bhargava | |
| 6,325,142 B1 | 12/2001 | Bosley et al. | |
| 6,326,752 B1 | 12/2001 | Jensen et al. | |
| 6,326,760 B1 | 12/2001 | Cardoletti et al. | |
| 6,429,615 B2 | 8/2002 | Schmider et al. | |
| 6,437,529 B1 | 8/2002 | Brown | |
| 6,445,879 B1 * | 9/2002 | Youn et al. | 388/811 |
| 6,486,633 B1 | 11/2002 | Kronenberg | |
| 6,487,096 B1 | 11/2002 | Gilbreth et al. | |
| 6,504,261 B2 | 1/2003 | Fogarty et al. | |
| 6,515,393 B2 | 2/2003 | Asao et al. | |
| 6,528,967 B2 | 3/2003 | Hallidy | |
| 6,548,976 B2 | 4/2003 | Jensen et al. | |
| 6,583,995 B2 | 6/2003 | Kalman et al. | |
| 6,717,318 B1 | 4/2004 | Mathiassen | |
| 6,781,331 B2 | 8/2004 | Mokri et al. | |
| 6,784,565 B2 | 8/2004 | Wall et al. | |
| 6,801,019 B2 * | 10/2004 | Haydock et al. | 322/17 |
| 6,838,860 B2 | 1/2005 | Huggett et al. | |
| 6,839,249 B2 | 1/2005 | Kalman et al. | |
| 6,870,279 B2 | 3/2005 | Gilbreth et al. | |
| 6,956,751 B2 * | 10/2005 | Youm et al. | 363/37 |
| 6,965,183 B2 | 11/2005 | Dooley | |
| 6,995,993 B2 | 2/2006 | Sarlioglu et al. | |
| 7,002,317 B2 | 2/2006 | Ganev | |
| 7,007,179 B2 | 2/2006 | Mares et al. | |
| 7,119,467 B2 | 10/2006 | Dooley | |
| 7,408,312 B2 * | 8/2008 | Itou et al. | 318/400.02 |
| 7,408,793 B2 * | 8/2008 | Jitaru et al. | 363/52 |
| 7,781,997 B2 * | 8/2010 | Kallioniemi et al. | 318/379 |
| 7,837,011 B2 * | 11/2010 | Takasaki et al. | 187/296 |
| 2002/0047455 A1 | 4/2002 | Dhyanchand et al. | |
| 2002/0190695 A1 | 12/2002 | Wall et al. | |
| 2002/0198648 A1 | 12/2002 | Gilbreth et al. | |
| 2003/0107349 A1 * | 6/2003 | Haydock et al. | 322/28 |
| 2004/0160792 A1 * | 8/2004 | Youm et al. | 363/37 |
| 2004/0239202 A1 | 12/2004 | Dooley | |
| 2005/0146307 A1 | 7/2005 | Dooley et al. | |
| 2005/0212466 A1 | 9/2005 | Rozman et al. | |
| 2005/0224296 A1 * | 10/2005 | Smith et al. | 187/277 |
| 2006/0061213 A1 | 3/2006 | Michalko | |
| 2006/0108882 A1 | 5/2006 | Michalko | |
| 2006/0113967 A1 | 6/2006 | Dooley | |
| 2006/0226721 A1 | 10/2006 | Dooley et al. | |
| 2006/0244428 A1 | 11/2006 | Jitaru | |

FOREIGN PATENT DOCUMENTS

| | | |
|---|---|---|
| DE | 3430590 | 2/1986 |
| DE | 19608152 | 11/1997 |
| EP | 0 449 687 | 10/1991 |
| EP | 1648096 A1 | 4/2006 |
| EP | 1764908 A1 | 3/2007 |
| EP | 1843459 | 10/2007 |
| GB | 1384156 | 2/1975 |
| JP | 55-61265 | 5/1980 |
| JP | 57132798 | 8/1982 |
| JP | 61251481 | 11/1986 |
| JP | 2000-341991 | 12/2000 |
| WO | WO 89/11523 | 11/1989 |
| WO | 2003028202 A1 | 4/2003 |
| WO | 2004068674 A2 | 8/2004 |
| WO | 2004068674 A3 | 8/2004 |
| WO | 2005010630 A1 | 2/2005 |
| WO | 2005025044 A1 | 3/2005 |

OTHER PUBLICATIONS

Toliyat, et al., Position Sensorless Control of Surface Mount Permanent Magnet AC(PMAC) Motors at Low Speeds, IEEE Transactions on Industrial Electronics vol. 49 Issue 1, Feb. 2002 pp.157-164(abstract).

International Search Report, PCT/CA2007/001585, Dec. 27, 2007.

European Search Report, EP07253722, Dec. 21, 2007.

* cited by examiner

MOTOR DRIVE ARCHITECTURE WITH ACTIVE SNUBBER

TECHNICAL FIELD

The description relates generally to electric motors and, more particularly, to the control of electric motors.

BACKGROUND

In control of electric machines such as permanent magnet motors, current pulses due to electrical transients may be flowed back to the power supply by the use of a transient suppression feedback diode. When the power supply is at some distance away from the motor control circuitry, current pulses flowing back to the power supply may cause resonance or noise issues in the power supply cables at certain motor speeds, or drive current frequencies. Another possible transient damping circuit, or "snubber circuit", uses a resistive element that is switched in to dissipate voltage transients. Such a resistive snubber circuit is less efficient as the electrical transients are dissipated as heat. Accordingly, there is a need to provide improvements which address these and other limitations of prior art motor control systems.

SUMMARY

In one aspect, there is provided an active electrical protection apparatus for damping electrical transients in a control circuit of an electrical machine having phase windings driven using a commutation circuit and powered through a power supply connection. The apparatus comprises a power dissipating circuit arranged in parallel with the commutation circuit, and having a resistive element for dissipating power when electrical transients are damped and a first switch for switchably connecting the resistive element; and a controller for receiving a resonance signal representative of a resonance condition on the power supply connection, and for commanding the first switch at least as a function of the resonance signal.

In another aspect, there is provided an active electrical protection apparatus for damping electrical transients in an electrical machine having phase windings driven using a commutation circuit and powered through a power supply connecting line. The apparatus comprises a power dissipating device arranged in parallel with the commutation circuit, and having a resistive element for dissipating power when electrical transients are damped; a transient suppression device arranged in series with the power dissipating circuit and with the commutation circuit, and having a feedback diode device arranged inversely relative to a drive current of the commutation circuit; a switching device for switchably connecting the power dissipating device and for switchably connecting the transient suppression device; and a switch controller for receiving a resonance signal representative of a resonance condition on the power supply connecting line, and for commanding the switching device at least as a function of the resonance signal.

In another aspect, there is provided a method for damping electrical transients in an electrical machine having phase windings driven using a commutation circuit. The method comprises: providing a resistive element arranged in parallel with the commutation circuit, the resistive element for dissipating power when electrical transients are damped; providing a feedback diode device arranged in series with the power dissipating circuit and with the commutation circuit, and arranged inversely relative to a drive current of the commutation circuit; evaluating a resonance condition based on at least one of a noise level on a power supply line and an operation frequency of the electrical machine; switching the feedback diode device in and out as a function of the resonance condition; measuring a voltage across the commutation circuit; comparing a value of the voltage to a limit voltage value to detect a voltage transient which determines a voltage condition; and switching the resistive element in and out as a function of the resonance condition and the voltage condition.

In another aspect, there is provided a method for damping electrical transients in an electrical machine having phase windings driven using a commutation circuit. The method comprises: providing a resistive element arranged in parallel with the commutation circuit, the resistive element for dissipating power when electrical transients are damped; evaluating an electrical resonance condition of a power supply line of the electrical machine; and switching the resistive element in and out as at least as a function of the electrical resonance condition.

Further details of these and other aspects will be apparent from the detailed description and figures included below.

BRIEF DESCRIPTION OF THE DRAWINGS

Reference is now made to the accompanying figures in which.

DETAILED DESCRIPTION

Figure 1:
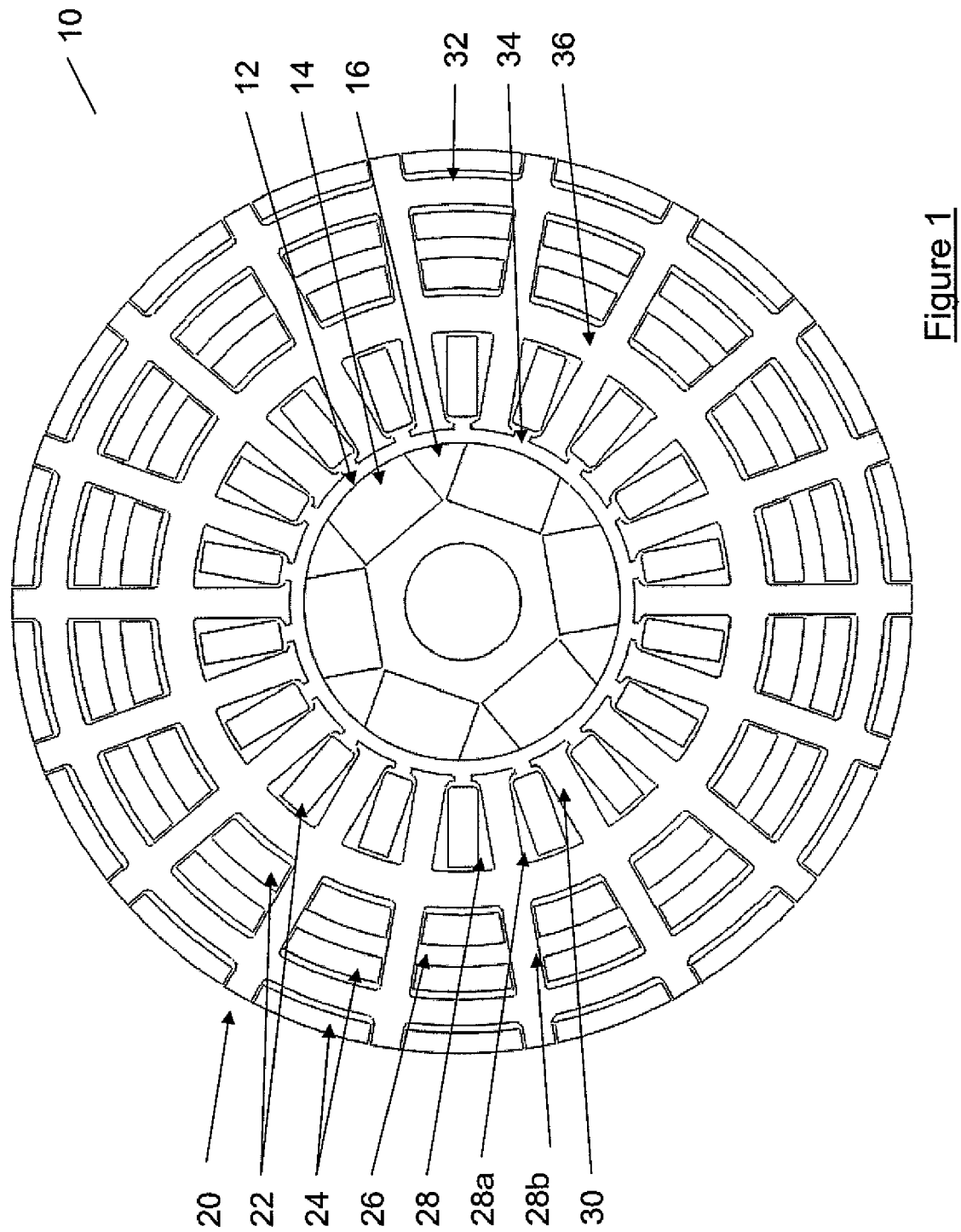
FIG. 1 is a cross-section of a permanent magnet motor.
Figure 2:
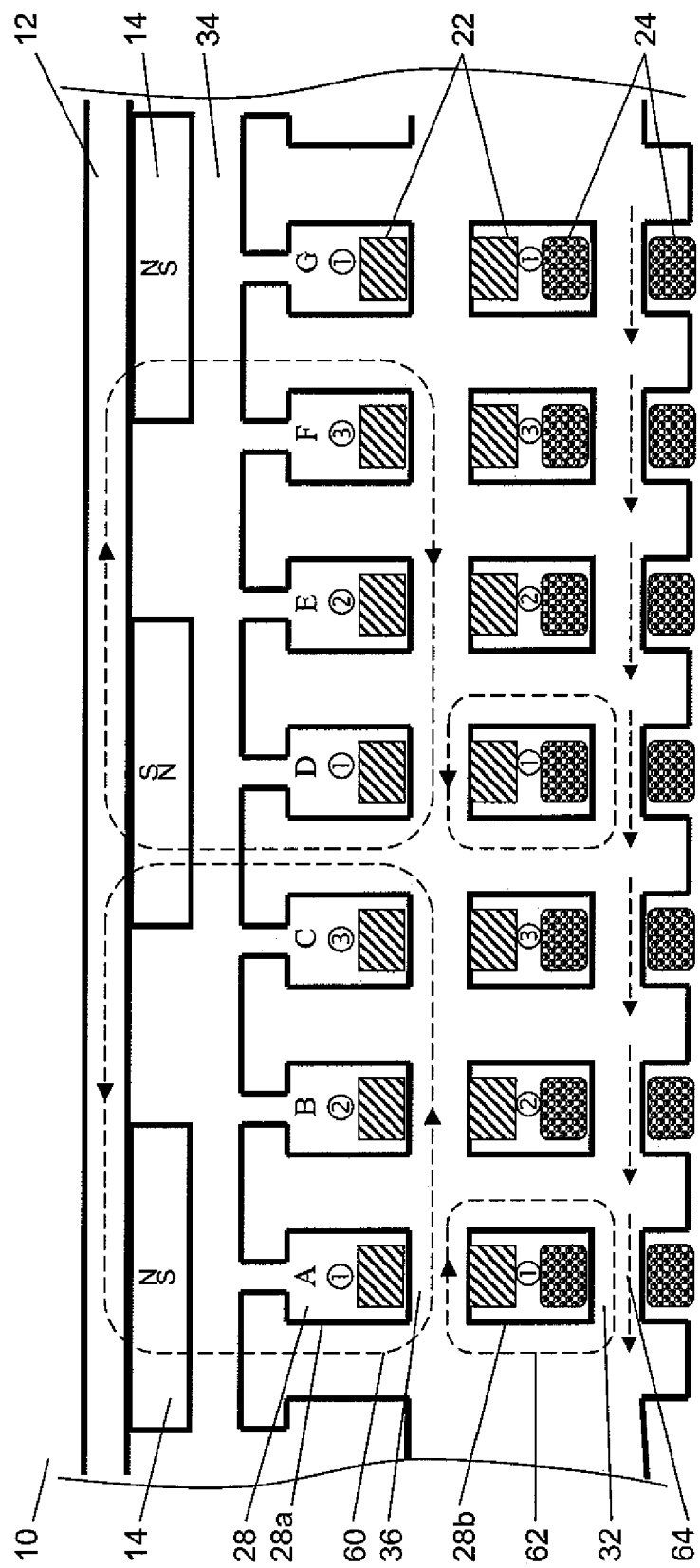
FIG. 2 is a partial schematic of the motor of FIG. 1.

Referring first to FIGS. 1 and 2, a permanent magnet (PM) electric machine 10 is depicted. For ease of illustration and description, FIG. 2 shows a linear arrangement of the electric machine 10 of FIG. 1. However, it is to be understood that the machine 10 may have the circular architecture of FIG. 1, with an inside or outside rotor. FIG. 1 shows an inside rotor. It will also be understood by the skilled reader that the Figures, as well as the accompanying description, are schematic in nature, and that routine details of machine design have been omitted for clarity, as will be apparent to the skilled reader. The machine 10 may be configured as an alternator to generate electrical power, a motor to convert electrical power into mechanical torque, or both. The motor aspects of such a machine are primarily of interest in the following description, and hence machine 10 will now be referred to as motor 10.

The motor 10 has a rotor 12 with permanent magnets 14, interposed by spacers 16, which rotor 12 is mounted for rotation relative to a stator 20. A retention sleeve (not shown) is typically provided to hold the permanent magnets 14 and the spacers 16. Stator 20 has at least one phase winding 22 and at least one control winding 24 (both windings are represented schematically in the Figures as a solid rectangles in cross-section, but the skilled reader will appreciate each may comprise multiple turns of a conductor, as described below). In the illustrated embodiment, the stator 20 has a 3-phase design with three essentially electromagnetically-independent phase windings 22 (the phases are denoted by the circled numerals 1, 2, 3, respectively in FIG. 2) and, correspondingly, three control windings 24. The phase windings 22 and control windings 24 are separated in this embodiment by a winding air gap 26 and are disposed in radial slots 28, divided into slot portions 28a and 28b, provided in the stator 20 between adjacent teeth 30. For ease of description, the adjacent slots 28a, 28b are indicated in FIG. 2 as A, B, C, D, etc. The phase windings 22 are electrically insulated from the control windings 24. A back iron 32, also referred to as the control flux bus 32 in this application, extends between and at the bottom of the slots 28b. A rotor air gap 34 separates rotor 12 and stator 20 in a typical fashion. A core or "bridge" portion, also referred to as the "power flux bus" 36 portion of stator 20 extends between adjacent pairs of teeth 30 in slot 28 to form the two distinct slots 28a and 28b. The first slots 28a hold the phase windings 22 only, and the second slots 28b hold both the phase windings 22 and control windings 24.

The materials for the PM motor 10 may be any one deemed suitable by the designer. Materials may comprise samarium cobalt permanent magnets, copper phase and control windings, a suitable electromagnetic material(s) for the stator teeth and power and control flux buses, such as electrical silicon steels commonly used in the construction of electromagnetic machines. The stator teeth, power and control flux buses may be integral or non-integral with one another, as desired. Each of the phase windings 22 in this embodiment consists of a conductor with 4 turns per slot, which enters, for instance, the first slot portion 28a of a selected slot 28 (e.g. at slot "A"), extends through the slot and exits the opposite end of the slot, and then radially crosses the power flux bus 36 to enter the second slot portion 28b of the same slot 28 (e.g. at slot "A"), after which it extends back through the length of the selected slot, to exit the second slot portion 28b, and hence exits the slot 28 on the same axial side of the stator as it entered. This path is repeated 4 times to provide the 4 turns of the phase winding in that slot set 28a, 28b, before proceeding to the next relevant slot set in the stator. The conductor of phase winding 22 then proceeds to the second slot 28b of the next selected slot 28 (e.g. slot "D" in FIG. 2), where the phase winding 22 then enters and passes along the slot 28, exits and radially crosses the power flux bus 36, and then enters the adjacent first slot portion 28a of the selected slot 28, and then travels through the slot again to exit slot 28a and the stator adjacent where the winding entered the slot 28b of the selected slot 28. This path is also repeated to provide the turns of the phase winding in this slot set 28a, 28b, before proceeding to the next relevant slot set in the stator. The phase winding then proceeds to the next selected slot 28 (e.g. slot "G"), and so the pattern repeats. A second phase winding 22 corresponding to phase 2 (not shown), begins in an appropriate selected slot (e.g. slot B of FIG. 2) and follow an analogous path, and may be wound in an opposite winding direction relative to winding 22 of phase 1. That is, the phase 2 winding 22 would enter the selected slot (slot B) via slot portion 28b (since phase 1 winding 22 entered slot A via slot portion 28a, above), and then follows a similar but opposite path to the conductor of phase 1, from slot to slot (e.g. slots B, E, etc.). Similarly, the phase 3 winding 22 may be oppositely-wound relative to phase 2, and thus enters the selected slot (e.g. slot "C") of the stator via slot portion 28a, and follows the same general pattern as phase 1, but opposite to the pattern of phase 2, from slot to slot (e.g. slots C, F, etc.). Thus, as mentioned, the phases of the phase winding 22 are oppositely-wound relative to one another, for reasons described further below.

Meanwhile, a control winding(s) 24 is wrapped around the control flux bus 32, in a manner as will now be described. In this embodiment, control winding 24 may form loops wrapped in a positive turn ratio relative to the phase winding. In this case, a control-to-phase turns ratio of 3:2 is contemplated, such that the control winding is wrapped 6 times around the control flux bus 32 (relative to the phase winding's 4 turns), for reasons described below. The control winding 24 and control flux bus 32 thus provide an integral saturable inductor in stator 20, as will be discussed below. The direction of winding between adjacent second slots 28b may be the same from slot to slot, and thus alternatingly opposite relative to the phase winding 22 of a same phase wound as described above, so that a substantially net-zero voltage is induced in each control winding 24, as will also be described further below. All loops around the control flux bus 32 may be in the same direction. Note that the control winding 24 does not necessarily need to be segregated into phases along with the phase windings, but rather may simply proceed sequentially from slot to slot (e.g. slots A, B, C, D, etc.). Although it is possible to alternate winding direction of the phase windings, and not alternate direction of the control windings, the phase and control windings may be wound in relative opposite directions and in equal slot numbers to ensure a substantially net-zero voltage is induced in each control winding 24 as a result of current flow in the phase windings 22, so that the function described below is achieved. If the control winding is segregated into phase correspondence with phase windings 22, for example to reduce its inductance by a series parallel arrangement, there are potentially equal numbers of slots of a given phase in which the phase winding and control winding are wound in opposite directions, to yield the desired induced net-zero voltage.

In use, in a motor mode, a 3-phase power source drives phase windings 22, which result in current flow in phase windings 22 and a primary magnetic flux along magnetic flux path or magnetic circuit 60. Interaction of permanent magnets 14 and primary magnetic flux causes rotor 12 to move relative to stator 20. When the current flow in phase windings 22 is appropriately controlled, the motor 10 rotates with a speed and torque. A current or voltage controller appropriately controls the current flow to the phase windings 22 such that an appropriate speed and torque is obtained. The current in the control windings in normal operation of the motor is substantially the same as the current flow in the phase windings, because they are connected in series, except that in this embodiment current may be DC in the control windings, and AC in the phase windings. The implications for motor control will be discussed further below.

Primary magnetic circuit 60 includes rotor 12, magnets 14, rotor air gap 34, power flux bus 36 and the portion of stator teeth 30 between rotor 12 and power flux bus 36. Primary magnetic circuit 60 encircles a portion of phase winding 22 and is generated in motor 10 by the combined effect of the rotor magnets and an electrical current in phase windings 22. Secondary magnetic circuit 62 includes power flux bus 36, control bus 32 and the portion of stator teeth 30 between control bus 32 and power flux bus 36. In this embodiment, secondary magnetic circuit 62 encircles the portions of the phase winding 22 and control winding 24 in slot 28b. Power flux bus 36 divides slot 28 into two slot portions or openings 28a and 28b, with one opening 28a for the phase winding only, and another opening 28b for the phase and control windings. The primary magnetic circuit 60 encircles an opening 28a while the secondary magnetic circuit 62 encircles an opening 28b. Opening 28a may be radially closer to the rotor than opening 28b. Power flux bus 36 is common to both the primary and secondary AC magnetic circuit paths in this embodiment. AC current in the phase windings 22 causes a secondary magnetic flux to circulate in the secondary magnetic circuit 62 when the control bus 64 is not in a saturated state. The primary and secondary magnetic circuits are non-overlapping (i.e. non-intersecting), and remote or isolated from one another. The secondary magnetic circuit is remote from, and does not include, the rotor and may be defined wholly within the stator assembly.

A tertiary magnetic circuit 64 circulates around control bus 32, as partially indicated in FIG. 2 (i.e. only a portion of the tertiary circuit is shown, as in this embodiment the tertiary circuit circulates around the entire stator 20). The control flux bus 32 may be common to both the secondary and tertiary magnetic circuit paths and thus the secondary and tertiary magnetic circuits share a common portion, namely the control bus 32, as will be discussed further below. At least a portion of control flux bus 32 is saturable by the flux density of the tertiary magnetic circuit.

Magnetic flux circulates the tertiary magnetic circuit 64 in the same direction around the control flux bus 32. As mentioned above, although the control winding 24 is provided in the second slots 28b corresponding to a particular phase of the three-phase machine described, the phase windings 22 are wound in the opposite direction in each first slot 28a which is due to the opposite polar arrangement of the magnets 14 associated with each adjacent first slot 28a of the phase. To ensure that a uniform direction for the tertiary magnetic circuit 64 is provided, as mentioned, the control windings 24 may be wound in the same direction in all second slots 28b.

When the control flux bus 32 is magnetically saturated, the inductance (thus impedance) of the phase windings is very low, as if there where no secondary AC magnetic circuit. However, if zero current is applied to the control winding (i.e. the control winding is open circuited, or otherwise switched off), the impedance of the phase windings increases significantly, thus limiting the current that can flow in the phase windings, which may be used to remediate, for example, a faulted condition, such as an internally shorted phase winding or short circuits in the drive electronics. This impedance control has beneficial implications for PM motor control, discussed further below.

It is to be understood that the above description applies only to phase "1" of the described embodiment, and that similar interactions, etc. occur in respect of the other phases. Further details and aspects of the design and operation of motor 10 are found in U.S. Pat. No. 7,262,539.

Thus, in use, in a motoring mode, a power source drives phase windings 22, and control windings 24. As will be described hereinbelow in reference to FIG. 4, in one example arrangement of the motor drive circuit, the two windings 22, 24 are effectively connected in series and thus the control winding current is equivalent (in magnitude) to the phase winding current. As a result of the 3:2 turns ratio between these two windings 22, 24, the slightly higher number of turns in the control winding helps ensure that the control bus is always in a fairly saturated condition during normal motor operation, so as to enable efficient functioning of the motor at any drive current. As discussed above, although the AC flux in the phase windings 22 tends to cancel out the DC flux in the control winding 24 in the control bus sections where the flux directions are in opposition, the 3:2 turn ratio bias in the control winding 24, prevents the fluxes from actually cancelling. Thus, when the control flux bus 32 is magnetically saturated by the action of current flowing through the control winding 24, the inductance (thus impedance) of the phase windings 22 is very low, as if there where no secondary AC magnetic circuit, and hence the control windings and secondary magnetic circuit would be essentially "invisible" to the motor during normal motor operation.

According to the example arrangement of the motor drive circuit of FIG. 4, the number of turns on the control winding slots will typically be chosen to be more than the number of turns in the phase winding slots, so as to ensure saturation of the control bus (however possibly not much into saturation, since some inductance in the control winding is a useful inductor for the buck regulator filter function as described below) by having just marginally more ampere turns on the control winding 24 than on the phase windings 22 in the secondary magnetic circuit. The DC flux in the control bus typically dominates relative to the opposing AC flux density in the secondary magnetic circuit, holding the control bus in saturation down to quite low relative values of drive current provided via the control winding 24 to the phase windings 22, even under the effects of the counter fluxes from the phase windings 22 (i.e. the portion of the phase windings 22 carrying AC in the negative portion of the cycle tends to reduce saturation of the control flux bus, unless the control ampere turns are high enough to maintain saturation).

In use in a fault or shut-down mode, when the drive current to the motor is at or close to zero, i.e. such as when the motor is shut down in response to a fault condition, the control bus de-saturates (as a result of no control current being supplied) and, as a result, the interaction between the primary and secondary magnetic circuits and the inductor-like effect of the control winding 24, impedes any significant generated currents from flowing in the phase windings due to continued rotation of the shut-down motor and any short circuit failure in the main phase circuits. Further discussion is found in U.S. Pat. No. 7,262,539.

Figure 3:
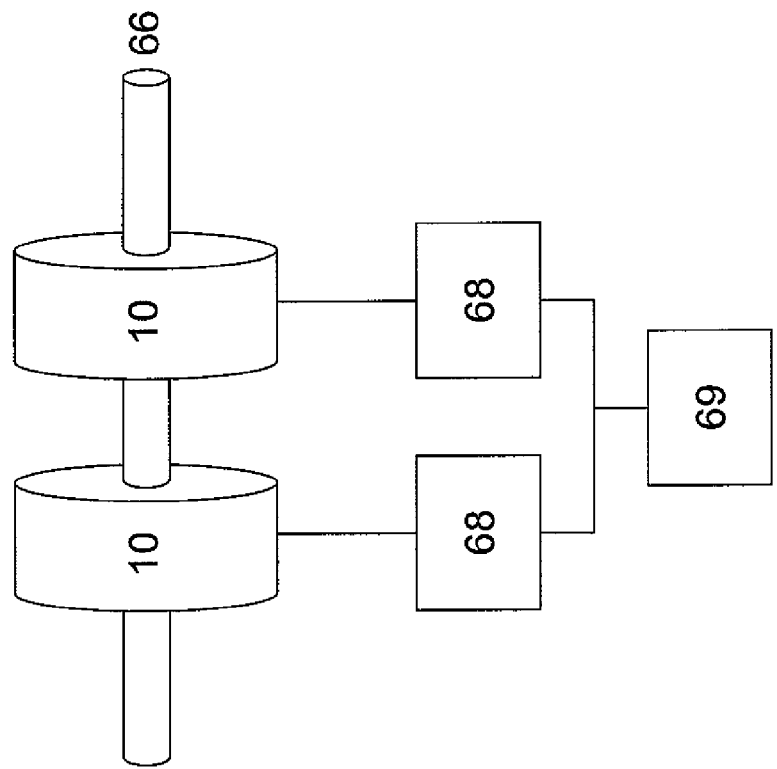
FIG. 3 is a schematic of an arrangement of two of the motor of FIG. 1.

FIG. 3 shows a redundancy arrangement in which two motors 10 are co-mounted on the same output shaft 66, and driven by suitable motor drives 68, each in communication with a system controller 69, and operated as described above. If one motor 10 should fail in a short circuit, open circuit or ground (whether in the motor itself or the drive electronics or lead wires), the drive(s) 68 may adjust control of the remaining motor 10 (or motors 10, if there are more than two provided in total, and two or more are to remain operational in the event of the shutdown of one) to compensate for the resulting loss in torque, and the failed motor is no longer driven. The controller 69 provides the appropriate control to motor drives 68. As described above, the failed motor is also in effect disconnected, by bringing current flow in its control windings to zero, resulting in the impedance of the phase windings of the failed motor increasing to a high value, as previously described, such that the drag torque due to a short circuit type failure is minimized. Motor failure detection 84 may be achieved using any suitable approach, such as identifying/measuring/detecting incorrect speed or torque as a function of current, voltage, high temperature, machine impedance, etc. Failure detection results in a signal provided to an appropriate controller for interrupting the current supply to the motor system (i.e. bringing current flow to zero, as mentioned above).

Figure 4:
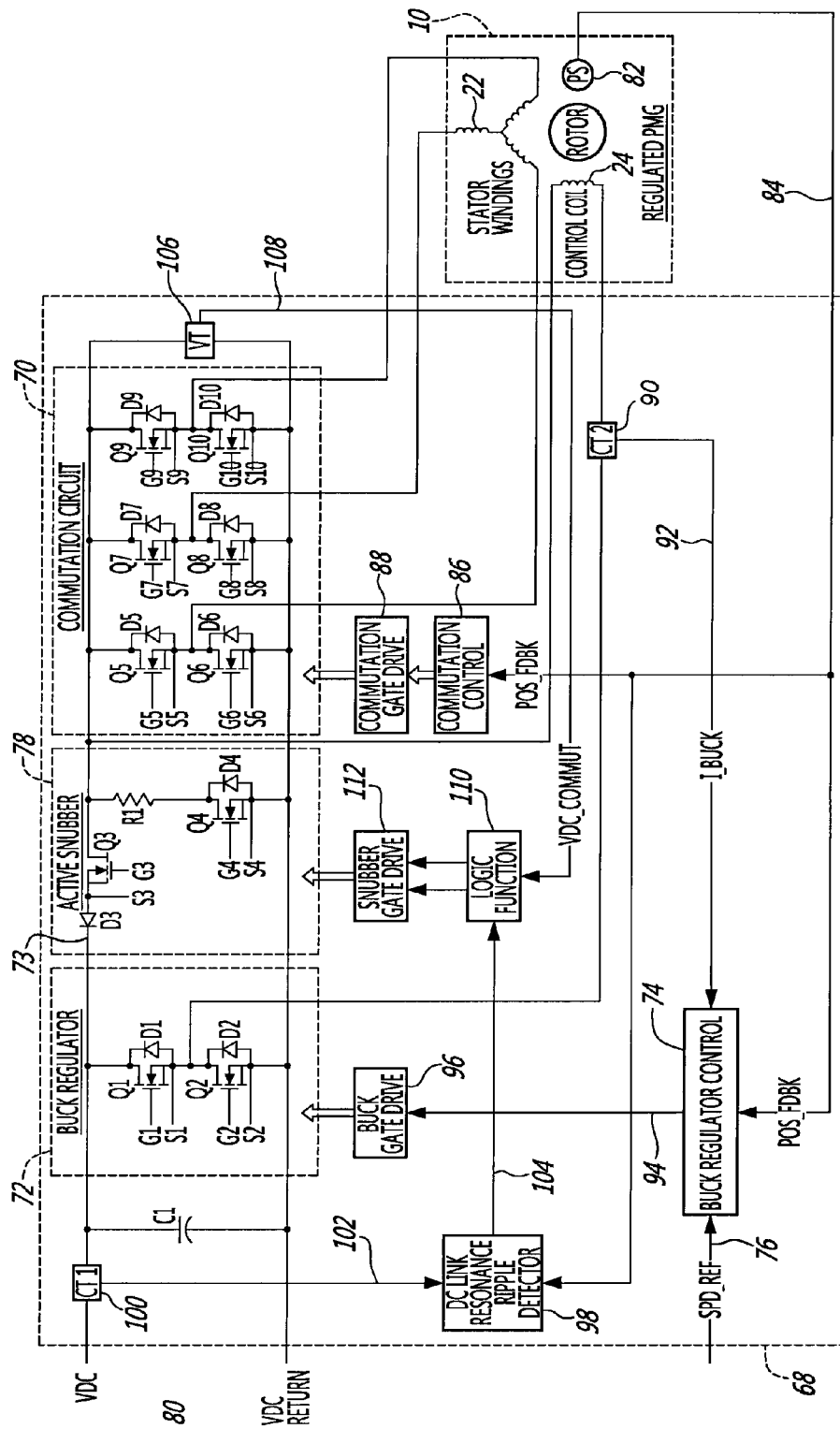
FIG. 4 is a schematic diagram of one channel of a motor drive circuit for the motors of FIG. 3.

FIG. 4 shows a simplified example scheme of a motor drive 68 for driving a motor 10. It should be noted that the motor 10 schematically depicted in FIG. 4 depicts only a single control winding 24 for the three phases of its associated phase winding set, the control winding 24 proceeding slot-to-slot in the stator irrespective of the phase arrangements of the phase windings 22. As discussed generally above, this is just one of many control winding arrangements possible, and the skilled reader will be able to apply the present teachings to such arrangements in light of the teachings herein.

The motor 10 is driven by the motor drive 68, comprising a three-phase H-bridge commutation circuit 70 driving the phase windings 22 of the motor 10. A commutation control 86 controls the commutation gate drive 88 of the commutation circuit 70 with feedback on the position of the motor 10, as read by a position sensor 82. The commutation scheme may be a six-step 120-degree overlapping scheme in a "make before break" sequence. This sequence in conjunction with an active snubber 78 reduces high amplitude voltage spikes occurring at the input of the inverter (commutation circuit) 70 due to the inductive effect of the stator windings 22 of motor 10 during motor commutation.

Current flow to the motor 10, and thus the motor's torque and speed, is adjusted using a suitable pulse width modulated supply system or "buck regulator" circuit 72 making use of the control winding 24 of the motor 10 as described below. The buck regulator 72 may be any suitable circuit. The skilled reader will appreciate that buck regulators typically require a filter inductor as an energy storage device for stepping down the voltage level. In this configuration, the buck regulator 72 uses the control winding 24 as its inductor, thus eliminating the need for an additional inductor, and consequently reducing the weight of the buck regulator 72. This filter inductor replacement role of the control winding 24 may dictate design features of the control winding 24, as the designer will consider the buck regulator requirements as well as the motor requirements in providing a suitable control winding configuration. The output of the control winding 24 is connected to the inverter (commutation circuits) 70, that operates in a six-step mode and provides AC current to the phase windings 22 of the motor 10.

In use, the buck regulator 72 varies the current flow to the phase windings 22 of the motor 10, and thus controls the torque and speed of the motor 10, based on an input speed request 76 received from system controller 69 (not shown). Current is provided from a DC source 80 to the phase windings 22, via the control winding 24, as already described.

The buck regulator 72 is controlled by a buck regulator controller 74 which adjusts the duty cycle of the buck regulator 72 to control the torque and speed of the motor 10. The regulator controller 74 receives the speed request 76, a position feedback signal 84 from the position sensor 82 and a current feedback signal 92 from a current transducer 90 measuring the drive current level at the control windings 24. The position feedback signal 84 is used to determine a speed error relative to the speed request 76, and the duty cycle of the buck regulator 72 is adjusted to vary the level of the drive current. A duty cycle signal 94 is provided to the buck gate drive 96 that controls switch Q1 and Q2 of the buck regulator 72.

The buck regulator 72, buck regulator controller 74 and buck gate drive 96 are of any suitable type, which includes suitable types well-known to the skilled reader, and thus need not be discussed further here.

An active snubber 78 is used to damp electrical transients occurring at the input of the inverter (commutation circuit) 70 due to the inductive effect of the stator windings 22 of motor 10 during motor commutation. The active snubber 78 uses a transient suppression feedback diode 73 for most of the operation frequencies of the motor 10. The power supply may be at some distance away from the motor control circuitry and current pulses flowing back to the power supply may cause resonance or noise issues in the power supply cables at certain motor speeds (or drive current frequencies). Accordingly, to avoid line impedance issues, the active snubber 78 is reconfigurable into a power dissipating circuit at resonance frequencies of the power supply network.

Accordingly, the active snubber 78 has a transient suppression circuit in series with the commutation circuit 70 and the power supply cables. The transient suppression circuit comprises a feedback diode 73 in series with switch Q3 (i.e., a MOSFET transistor) to switch in and out the feedback diode 73. The feedback diode 73 is connected inversely relative to the drive current so that voltage pulses at the inductors of the motor 10 are passed on to the power supply on electrical transients, and the commutation circuit 70 is thereby protected. The feedback diode 73 is used (i.e. "in") during most of the operation of the motor 10 and ensures an efficient operation of the motor system at most drive frequencies.

However, at resonant frequencies of the power supply network, voltage pulses due to electrical transients are damped in a power dissipating circuit, to eliminate the generation of high voltages and currents that would otherwise result when the line inductance/impedance resonates with power supply capacitance at specific frequencies of motor or buck regulator operation. The power dissipating circuit is arranged in parallel with the commutation circuit 70 and comprises a resistive element, i.e. resistor R1, in series with switch Q4 (i.e. a MOSFET transistor). The power dissipating circuit is only used when the drive current corresponds to resonant frequencies. The feedback diode 73 is then switched "out" and switch Q4 switches R1 "in" in order to damp high-level voltage pulses at the commutation circuit 70. Accordingly, no more than one of the resistor R1 and feedback diode 73 is switched "in" at a time. R1 will depend on the voltage range of the drive, for low (28) voltage drives this value may be from 0.1 ohm to 2 or 3 ohms, for higher voltage systems the resistor value will be proportionally higher. It is noted that the MOSFET switches may be replaces by other types of devices for high voltage type applications.

In order to define the switch condition of switch Q3 and switch Q4, a resonance detector 98 detects an electrical resonance on the power supply lines using a current measurement 102 provided by a current transducer 100 installed at the power supply cables, and the position feedback signal 84 provided by the position sensor 82. The resonance detector 98 evaluates the frequency of the drive current using the variation of the position feedback signal 84 in time and also evaluates the amplitude of ripple component on the nominally direct current of the power supply cables using line current measurement 102. The resonance condition is determined as a combination of the two inputs. It is noted that in this embodiment the frequency of the induced noise ripple on the power supply lines is six times the motor operation electrical frequency. Resonance is detected by monitoring the magnitude of dc link current using current sensor 100. The motor position feedback signal 82 provides motor rotor position data that is used to identify ripple on the dc bus that caused by the motor commutation. A resonance signal 104 representative of a resonance condition on the power supply line is provided to a switch controller 110.

The switch controller 110 along with snubber gate drive 112 controls switch Q3 and switch Q4 of the active snubber 78. When the noise ripple level on the DC bus is below a predetermined value, Q3 is closed to switch "in" the feedback diode 73 and allow transient suppression.

When a resonance condition is detected by the resonance detector 98, the feedback diode 73 is switched "out" and the power dissipating circuit is used to dissipate high-level voltage pulses typically on a cycle by cycle basis. Switch Q4 is then controlled as a function a voltage measurement across the commutation circuit 70 on a cycle by cycle basis. Accordingly, a voltage signal 108 is provided by a voltage transducer 106. Switch Q4 is switched on to switch the resistor R1 "in"

and dissipate the electrical transient when the voltage measurement reaches a limit instantaneous voltage value, in order to limit voltage transient across the commutation circuit 70 from rising above a predetermined limit. Damages to the commutation circuit 70 are thereby prevented. Voltage transients are dissipated in resistor R1 instead of being fed back to the power supply circuit as current pulses, which limits the noise due to resonance on the power supply lines and thereby avoids high AC voltages and currents from occurring in the power supply system. Furthermore, the dissipating function of the snubber 78 is only used in case of high voltage transients across the commutation circuit 70. A more efficient dissipative snubber is thereby provided.

The active snubber 78 advantageously provides an efficient operation of the motor system at most operation frequencies except the resonant frequencies of the power supply network, where the electrical transients are dissipated in a resistive element as heat.

Referring again to FIG. 3, both motors 10 and their associated controllers 68 are arranged as described with reference to FIG. 4, to provide a dual redundant motor system. To enhance redundancy protection, separate DC sources 80 are provided for each motor system. The operation of such a dual redundant system according to FIGS. 1-5 will now be described.

Referring again to FIG. 3 and to FIG. 4, in a normal operation mode of the motors 10, the drive 68 to each motor 10 is adjusted so that the motors contribute in desired proportions to the torque delivered to shaft 66, and the shaft rotates at a desired speed, as requested by system controller 69. Both motors 10 may be driven concurrently to provide torque and, when a higher efficiency operation or higher power operation is desired, the respective drives 68 can be adjusted accordingly to adjust the contribution proportion of each motor 10. The control winding 24 of each motor 10 functions as the filter inductor for its respective buck regulation circuit 72, as described above. Also as described above, the control winding 24 of each motor may also keep its respective control bus saturated (by virtue of the relative turns ratio between phase and control winding) to keep the control winding otherwise virtually "invisible" to the motor 10. Should one motor 10 fail, such as in a short circuit, open circuit or ground, the drive 68 to the other motor 10 can be adjusted using its buck regulator 72 to increase the AC input to the phase windings 22 of the operational motor 10 to compensate for the loss in torque caused by loss of the other motor 10. As the skilled reader will appreciate, the failed PM motor 10 can tend to add drag and heat to the system, however with the present arrangement the failed motor 10, can be "turned off" by no longer energising the windings (i.e. and thus the current in the control winding is reduced to zero), which thus adjusts the failed motor 10 to a high impedance condition for the phase windings, as already described, thereby minimizing drag and heat generation. The current to the respective control windings and inverters is controlled by external control signals provided to the buck regulator circuits. If the system controller 69 requests zero current, then the relevant buck regulator stops providing current accordingly. This control command may be based on the system controller 69 detecting a fault or other command to set the current to zero. The resulting adjustment of the impedance characteristics of the phase windings of the affected motor 10, from low impedance during proper motor function to a high impedance in the failed condition, results in much improved operation and controllability, particularly in PM motors where rotor excitation cannot be independently controlled.

Figure 5:
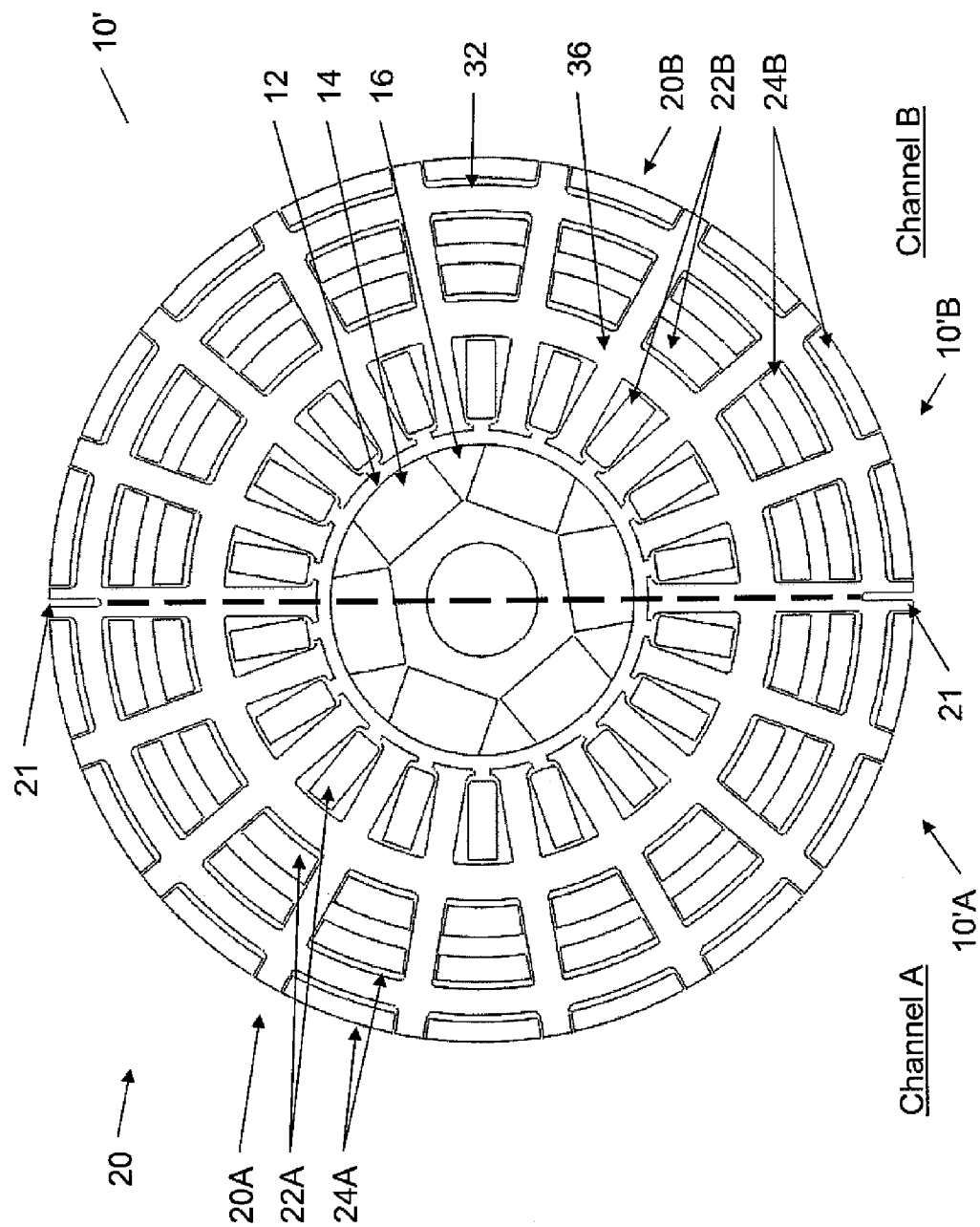
FIG. 5 is a cross-sectional view, similar to FIG. 1, of a another arrangement for a motor.

FIG. 5 illustrates a 3-phase, "dual channel" PM motor 10' according to the general "multi-channel" principles described in applicant's U.S. Pat. No. 6,965,183, but modified in accordance with the above teachings, as will now be discussed further. The same reference numerals are used to denote the analogous elements described with reference to the embodiments above, and thus all elements will not be redundantly described here. Stator 20 of dual channel PM machine 10' is conceptually divided into an "A" half and a "B" half, thus providing a distinct stator sector for each channel, each channel provided with its own independent winding sets. Thus windings 22 and 24 will be described in terms of phase winding sets 22A and 22B and control winding sets 24A and 24B, as discussed further below. Other features associated with channels A and B are also described as "A" or "B", specifically, to indicate their respective channels.

Motor 10' has a multi-channel architecture (in this case, dual channel), in that a plurality of circumferentially distributed distinct and fully independent (i.e. electromagnetically separate) "sets" of phase and control windings are provided in each stator sector corresponding to the multiple channels. In this case, two such sets of 3-phase phase and control windings are provided, namely a 3-phase set of phase windings 22A and 22B and respective control windings 24A and 24B (which happen to be single phase in this embodiment). This multi-channel architecture provides a plurality of functional "motor elements" within the same machine structure, which may either be operated in conjunction, or independently, as desired. The construction of motor 10' is otherwise generally as described above with respect to the single channel embodiment of motor 10.

The dual channel PM motor 10' provides a single rotor rotating relative to two effectively independent stators, or stator sections. Thus, rotor 12 rotates relative to a stator sector 20A (i.e. the portion of stator 20 with phase windings 22A) and also relative to a stator sector 20B (i.e. the portion of stator 20 with phase windings 22B). When operated as a motor, the two "motors" (i.e., in effect, motors 10'A and 10'B) are driven independently, as described generally above with respect to motor 10, but are synchronized such that they co-operate, as if only one "motor" is present. In normal motoring mode, the two "motors" (10'A and 10'B) of motor 10' are operated as described above with respect to motors 10 in FIG. 3. Likewise, if one channel of the machine 10' should fail in a short circuit, open circuit or ground (whether in the motor 10' itself, or in the drive electronics or lead wires), the drive to the remaining channel is adjusted to compensate for the loss in torque, and the failed channel is no longer driven. The drive of the failed channel is effectively disconnected by bringing current flow in the control windings 22A or 22B to zero, resulting in the impedance of the phase windings 24A or 24B of the channel increasing to a high value, as previously described, such that the drag torque due to a short circuit type failure in the channel is minimized. This multi-channel configuration offers two fully redundant systems (i.e. channel A and channel B) with a minimum of hardware, thereby minimizing weight and space and increasing reliability. Channel failure detection may be achieved using any suitable approach, such as incorrect speed or torque as a function of current, voltage, high temperature, machine impedance, etc.

Referring again to FIG. 5, the stator of the multi-channel motor 10' includes means for impeding cross-talk between the tertiary magnetic circuits of channels A and B, such as is described in applicant's co-pending U.S. patent application Ser. No. 11/419,238 filed May 19, 2006. As described in that application, the presence of a cross-talk reduction feature, such a stator slit 21 acts to substantially contain the tertiary magnetic flux within the channel. As such, the tertiary magnetic flux travels along the entire length of the control flux bus 32 to the channel boundary, where the presence of the cross-talk reduction slit 21 redirects the flux up to power flux bus 36, where it then travels back along entire length of the power flux bus 36 (this flux is not present, and therefore not depicted, in the single channel embodiment of FIG. 2), until the path joins up again with the beginning of the tertiary path, in the vicinity of another cross-talk reduction slit 21.

Figure 6:
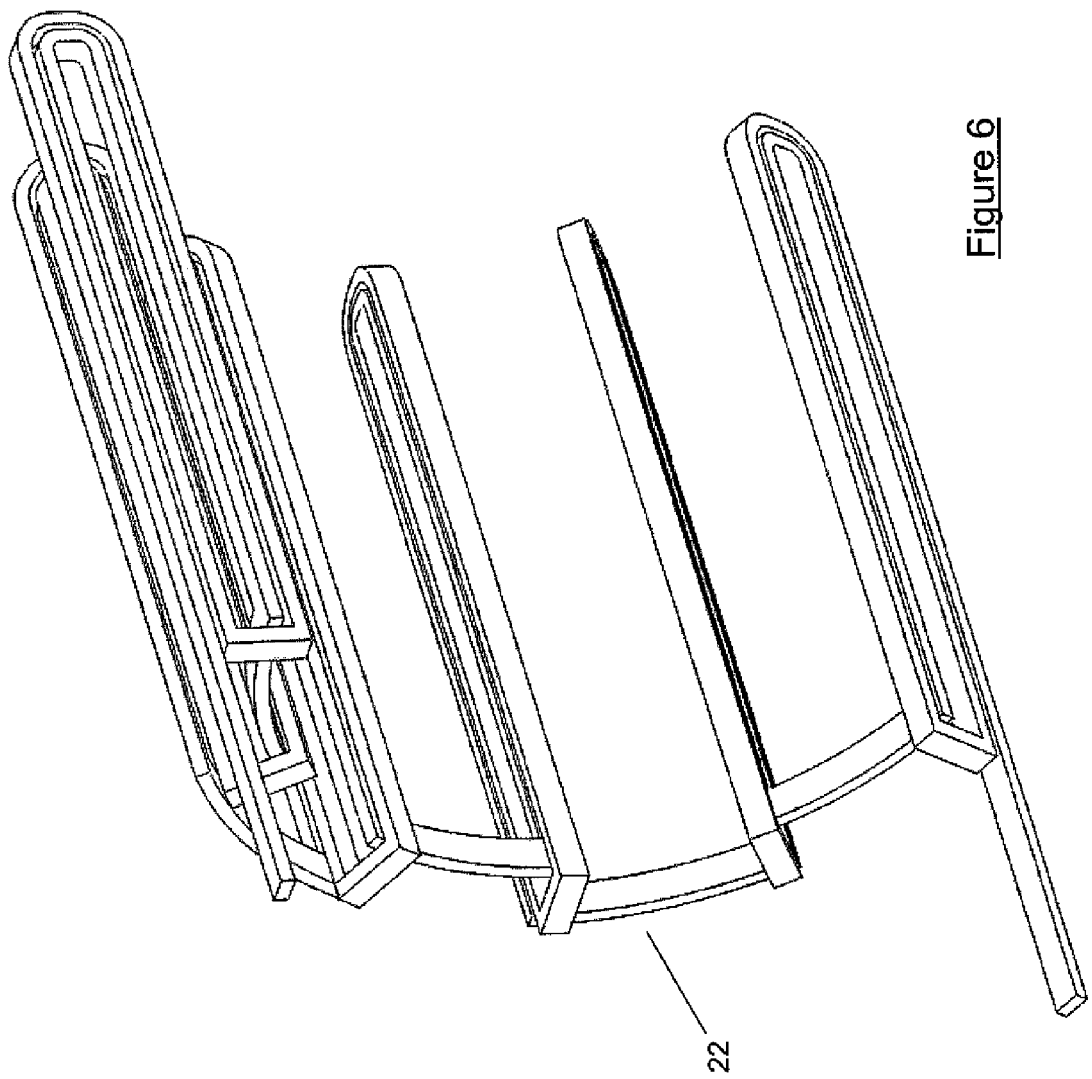
FIG. 6 is an isometric view of a portion of a phase winding of the motor of FIG. 5.

FIG. 6 shows an isometric free-space view of a portion of a phase winding 22A of the motor of FIG. 4, but for the fact that only two turns are shown for reasons of drawing clarity.

Figure 7:
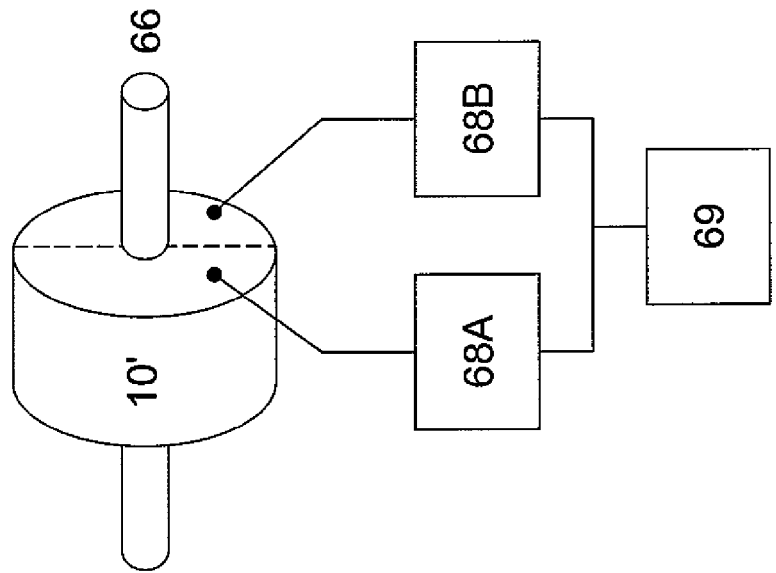
FIG. 7 is a schematic diagram of a control scheme for the motor of FIG. 6.

Referring to FIG. 7, a control system for dual-channel motor 10' is shown. FIG. 7 is similar to FIG. 3, but for the configuration of motor 10' in FIG. 7 relative to two motors 10 of FIG. 3. Motor drives 68A and 68B are each as described above with respect to FIG. 4, and these two independent motor drives are provided, one for each channel of motor 10'. In use, a similar operation is obtained when the control scheme of FIG. 4 is applied to the dual channel motor 10' of FIG. 7. Accordingly, in normal operation, channels A and B may be operated separately, or conjunctively, and motor drives 68A and 68B are controlled accordingly by controller 69. When a failure is detected on one motor channel, the current flow in its respective control windings 24A or 24B is set to zero in order to increase impedance of the phase windings 22A or 22B and thereby minimize a drag torque and other undesirable effects otherwise brought on by the failed channel.

The dual-channel design of FIGS. 6 and 7 offers obvious size and weight savings over the two motors system as shown in FIGS. 4 and 5. The two-motor design of FIGS. 3 and 5, however, has its own advantages over the dual-channel arrangement of FIGS. 6 and 7, such as simplicity of individual components.

It is contemplated that, although the active snubber 78 is described herein in conjunction with an embodiment wherein the motor 10 has control windings 24 and is used in a dual fail-safe motor configuration, the active snubber circuit 78 can also be advantageously used in the motor drive circuit of any single motor and of motors without control windings 24. In any case, the buck regulator can use an independent inductor winding. Accordingly, the active snubber 78 described herein is not limited to this particular application but can be extended to any other motor drive application.

The skilled reader will appreciated that the resonance condition which determines the switch condition of the active snubber 78 can be determined using variable inputs. For example, the resonance condition may be determined according to only the operation frequency of the motor. If the operation frequency to which resonance noise appears on the power supply line is predetermined, switch Q3 and switch Q4 may be controlled as a function of the operation frequency instead of being a function of the noise level, the operation frequency being representative of a resonance condition on the power supply line. The operation frequency may be determined using the position sensor 82 or, alternatively, the speed request signal 76 could be used as an input of the resonance detector 98.

While a combination of the current ripple amplitude on the power supply lines and of the frequency of the position feedback signal is used in the illustrated embodiment to determine the resonance condition, one will understand that a single one of the current ripple amplitude and the frequency of the motor could alternatively be used.

Furthermore, other parameters can alternatively be used to evaluate the resonance condition. For example, a temperature measurement on the power supply lines or elsewhere could be used to evaluate the resonance condition.

The skilled reader will appreciate that a failure is not required to turn a channel or motor "off" as described above, but rather the approach may be used in any suitable situation where it is desired to shut a channel "off", including as part of a normal operation scheme.

In another control scheme, the dual motor arrangement of FIG. 3, or as the case may be, the dual channel motor of FIG. 7, is controlled using a modified motor drive in which buck regulator 72 has a dedicated filter inductor independent from the control windings 24. Separate DC current sources respectively drive the phase and control windings independently from one another. Phase windings may be driven as described above so that torque is split as desired among the motors or channels in normal operation, during which time the DC source provides control current at a sufficient level to keep the control flux bus fully saturated at all times, for reasons already described. In the event of a channel failure, phase winding current in the other motor/channel is adjusted to compensate for the loss of torque due to the failed channel, while the current from source 81 to the control winding(s) for the failed channel is brought to zero to minimize the drag torque due to the failed channel.

In this embodiment, the control winding has different design constraints than those of the above embodiments, and thus the control winding may have a higher number of turns relative to the phase windings, to minimise the amount of control current required to saturate and maintain saturation in under the influence of desaturating fluxes from the main phases.

In the arrangement of FIG. 7, where the control current is supplied from a source separate from the phase windings, and is independently variable relative to the phase windings, if the phase winding current in the motor/channel exceeds a specific value, such as a desired maximum limit, the inductance of the phase winding will abruptly increase, tending to limit the current in the phase winding to that specific value or limit. This can be used to simplify the drive system of very low impedance (i.e. high speed) PM motors. For example, the motor can be designed using this feature to intrinsically limit inrush current on start-up by appropriately designing this feature into the motor, such that other typical inrush limiting techniques, such as duty cycle control, may be omitted or operated at lower frequencies.

The above description is meant to be exemplary only, and one skilled in the art will recognize that changes may be made to the embodiments described without departing from the scope of the embodiments disclosed. Such modifications are intended to fall within the scope of appended claims.

What is claimed is:

1. An active electrical protection apparatus for damping electrical transients in a control circuit of an electrical machine having phase windings driven using a commutation circuit and powered through a power supply line, the apparatus comprising:

a power dissipating circuit arranged in parallel with said commutation circuit and configured to dissipate power on the power supply line, the power dissipating circuit having a resistive element and a first switch configured to switchably connect said resistive element to the power supply line;

a resonance detector configured to evaluate a frequency of a current on the power supply line, detect a resonance condition on said power supply line based on the evaluated frequency and provide a resonance signal representative of the resonance condition; and a controller configured to receive the resonance signal and command said first switch at least as a function of said resonance signal.

2. The active electrical protection apparatus as claimed in claim 1, further comprising a transient suppression circuit arranged in series with said power dissipating circuit and with said commutation circuit, said transient suppression circuit having a feedback diode device arranged inversely relative to a drive current of said commutation circuit and a second switch for switchably connecting said feedback diode device, said controller being further for commanding said second switch as a function of said resonance signal, no more than one of said resistive element and said feedback diode device being switched in at a time.

3. The active electrical protection apparatus as claimed in claim 2, wherein said first switch and said second switch each comprises a Metal Oxide Semiconductor Field Effect Transistor (MOSFET).

4. The active electrical protection apparatus as claimed in claim 1, further comprising a current transducer for measuring the current at said power supply line and for providing a current signal, said current signal to be provided to said resonance detector for detecting said resonance condition.

5. The active electrical protection apparatus as claimed in claim 4, further comprising a position sensor for sensing a position of said electrical machine and for providing a position signal, said resonance detector receiving said position signal in time for evaluating an operation frequency of said machine for use in detecting said resonance condition.

6. The active electrical protection apparatus as claimed in claim 1, further comprising a voltage transducer for measuring a voltage at said commutation circuit and for providing a voltage signal, said voltage signal to be provided to said controller for commanding said first switch as a function of said voltage signal and said resonance signal.

7. An active electrical protection apparatus for damping electrical transients in an electrical machine having phase windings driven using a commutation circuit and powered through a power supply connecting line, the apparatus comprising:
a power dissipating device arranged in parallel with said commutation circuit, and having a resistive element configured to dissipate power on the power supply connecting line when the electrical transients on the power supply connecting line are damped;
a transient suppression device arranged in series with said power dissipating circuit and with said commutation circuit, and having a feedback diode device arranged inversely relative to a drive current of said commutation circuit;
a switching device configured to switchably connect said power dissipating device to the power supply connecting line and to switchably connect said transient suppression device;
a resonance detector configured to evaluate a frequency of a current on the power supply line, detect a resonance condition on said power supply line based on the evaluated frequency and provide a resonance signal representative of the resonance condition; and
a switch controller configured to receive the resonance signal and command said switching device at least as a function of said resonance signal.

8. The active electrical protection apparatus as claimed in claim 7, wherein said switching device comprises a first switch connected in series with said power dissipating device for switching it in and out, and a second switch connected in series with said transient suppression device for switching it in and out.

9. The active electrical protection apparatus as claimed in claim 7, further comprising a voltage transducer for measuring a voltage at said commutation circuit and for providing a voltage signal, said voltage signal to be provided to said switch controller for commanding said switching device as a function of said voltage signal and said resonance signal.

10. A method for damping electrical transients in an electrical machine having phase windings driven using a commutation circuit, the machine further having a resistive element arranged in parallel with said commutation circuit wherein the resistive element is configured to dissipate power when electrical transients are damped and a feedback diode device arranged in series with said power dissipating circuit and with said commutation circuit, and arranged inversely relative to a drive current of said commutation circuit, the method comprising:
evaluating a resonance condition based on at least one of a frequency of a current on a power supply line and an operation frequency of said electrical machine;
switching said feedback diode device in and out as a function of said resonance condition;
measuring a voltage across said commutation circuit;
comparing a value of said voltage to a limit voltage value to detect a voltage transient which determines a voltage condition; and
switching said resistive element in and out as a function of said resonance condition and said voltage condition.

11. The method as claimed in claim 10, wherein said feedback diode device is switched in when a value of said current on the power supply line is below a predetermined value.

12. The method as claimed in claim 11, wherein said resistive element is switched in when a value of said current on the power supply line is above said predetermined value and said value of said voltage signal is above said limit voltage value.

13. A method for damping electrical transients in an electrical machine having phase windings driven using a commutation circuit, the electrical machine further having a resistive element arranged in parallel with said commutation circuit, the resistive element for dissipating power when electrical transients on a power supply line are damped, the method comprising:
evaluating a frequency of a current on the power supply line of said electrical machine;
detecting a resonance condition on said power supply line based on the evaluated frequency; and
switching said resistive element in to damp electrical transients on the power supply line and out at least as a function of said electrical resonance condition.

14. The method as claimed in claim 13, wherein said resonance condition is also based on an operation frequency of said electrical machine.

* * * * *